(12) United States Patent
Tsukagoshi (10) Patent No.: US 7,206,108 B2
(45) Date of Patent: Apr. 17, 2007

(54) METHOD FOR RECORDING AND REPRODUCING HOLOGRAPHIC DATA AND HOLOGRAPHIC RECORDING MEDIUM

(75) Inventor: Takuya Tsukagoshi, Tokyo (JP)

(73) Assignee: TDK Corporation, Tokyo (JP)

(*) Notice: Subject to any disclaimer, the term of this patent is extended or adjusted under 35 U.S.C. 154(b) by 59 days.

(21) Appl. No.: 10/800,607

(22) Filed: Mar. 15, 2004

(65) Prior Publication Data

US 2004/0184122 A1    Sep. 23, 2004

(30) Foreign Application Priority Data

Mar. 17, 2003    (JP)    ............... 2003-072610

(51) Int. Cl.
   *G03H 1/04*    (2006.01)
(52) U.S. Cl. .................... 359/35; 359/22; 369/103
(58) Field of Classification Search .................. 359/15, 359/35, 32, 22; 369/103, 44.11
   See application file for complete search history.

(56) References Cited

U.S. PATENT DOCUMENTS

| | | | |
|---|---|---|---|
| 4,870,508 A | 9/1989 | Van Rosmalen et al. | ... 358/342 |
| 5,784,353 A | 7/1998 | Matsui | ........ 369/102 |
| 6,738,322 B2 | 5/2004 | Amble et al. | ............ 369/44.27 |
| 6,909,529 B2* | 6/2005 | Curtis | .......... 359/30 |
| 7,031,038 B2* | 4/2006 | Ogasawara et al. | ........... 359/22 |
| 2002/0041564 A1 | 4/2002 | Yoshinari et al. | ........ 369/275.3 |
| 2003/0063342 A1* | 4/2003 | Horimai | ............ 359/22 |
| 2004/0001400 A1* | 1/2004 | Amble et al. | ........... 369/44.26 |
| 2004/0184122 A1 | 9/2004 | Tsukagoshi | .......... 359/35 |
| 2004/0212859 A1* | 10/2004 | Tsukagoshi | ............ 359/15 |

FOREIGN PATENT DOCUMENTS

| | | |
|---|---|---|
| DE | 101 34 769 A1 | 4/2002 |
| JP | 2001-291242 | 10/2001 |
| JP | 2001-357542 | 12/2001 |
| JP | 2002-63733 | 2/2002 |
| JP | 2002-063733 | * 2/2002 |
| JP | 2002-123949 | 4/2002 |
| JP | 2001-291242 | * 10/2005 |
| WO | WO 02/075727 | 9/2002 |

* cited by examiner

*Primary Examiner*—Leonidas Boutsikaris
(74) *Attorney, Agent, or Firm*—Seed IP Law Group PLLC (57) ABSTRACT

A holographic recording and reproducing method for recording holographic data in and reproducing holographic data from a holographic recording medium including a recording layer in which data are to be recorded as phase information of light by projecting a signal beam and a reference beam thereonto and an optical modulation pattern periodically formed in a direction of a track on a surface located on the opposite side of the recording layer as viewed in the direction of signal beam and reference beam incidence on the holographic recording medium, the holographic recording and reproducing method including a step of projecting a light beam for servo control onto the holographic recording medium so as to substantially focus onto the surface on which the optical modulation pattern is formed, thereby generating clock signals in synchronism with the optical modulation pattern.

According to the thus constituted holographic recording and reproducing method, it is possible to generate accurate clock signals and remove noise superposed on a reproduced light beam.

7 Claims, 6 Drawing Sheets

METHOD FOR RECORDING AND REPRODUCING HOLOGRAPHIC DATA AND HOLOGRAPHIC RECORDING MEDIUM

BACKGROUND OF THE INVENTION

The present invention relates to a method for recording and reproducing holographic data and a holographic recording medium, and more particularly, to a method for recording and reproducing holographic data and a holographic recording medium which can generate accurate clock signals and remove noise superposed on a reproduced light beam.

DESCRIPTION OF THE PRIOR ART

The holographic method of recording and reproducing information is known as one method for realizing high-density information recording on a recording medium. In an ordinary holographic recording and reproducing method, information is recorded by overlapping a signal beam and a reference beam on the holographic recording medium to write the interference fringes formed thereby. The information recorded in the recording medium can be reproduced by irradiating the recording medium with the reference beam. The reference beam projected onto the recording medium is diffracted by the diffraction grating formed by the interference fringes, thereby causing two-dimensional information to appear as reproduced information. In such a recording medium, since all of the image information carried by the signal beam is reproduced at one time, high speed reproduction can be realized.

In a conventional method for recording and reproducing holographic information, it is normal to project a signal beam and a reference beam onto a record position on a holographic recording medium with a predetermined angle therebetween when information is to be recorded, thereby holographically recording information and to project the reference beam onto the record position on the holographic recording medium and to detect light transmitted through the holographic recording medium when information is to be reproduced, thereby reproducing information. Laser pulses for recording information are instantaneously projected from a laser beam source onto a holographic recording medium when information is to be recorded and laser pulses for recording information are instantaneously projected from a laser beam source onto a holographic recording medium when information is to be reproduced, while a shutter of a CCD image sensor is being held open and the window width of the CCD image sensor is set to be narrow.

Further, in the case where concavo-convex patterns are formed on a holographic recording medium in order to obtain servo information, when a laser beam for reproducing information passes through the concavo-convex patterns, since noise is superposed on a reproduced image due to the concavo-convex patterns, it is necessary to remove noise. Therefore, a method for reducing noise due to the structure of a holographic recording medium or surrounding light has been proposed (See Japanese Patent Application Laid Open No. 13-291242). In this method, a light beam including an S polarized light and a P polarized light is polarizably split, a signal is added to only the S polarized light, the S polarized light and the P polarized light are again merged to generate a light beam and the light beam is projected onto a holographic recording medium. When information is to be reproduced, images of an S polarization component and a P polarization component are independently detected and a difference signal between the images is obtained, thereby removing noise common to the S polarization component and the P polarization component.

As described above, in the conventional method for recording and reproducing holographic information, since laser pulses are instantaneously projected onto a holographic recording medium and the window width is correspondingly set to be narrow, timing has to be accurately controlled.

Further, in the case where information is to be continuously recorded in or reproduced from a holographic recording medium, accurate position control of a laser beam is required for moving the laser beam to a next record position and it is necessary to shift the position irradiated with the laser beam so as to accurately coincide with each of discrete record positions where holographic information is to be recorded. Particularly, in the case of shift multiplexing, since it is necessary to slightly shift the laser beam, a more accurate position control of a laser beam is required. Therefore, clock signals in accurate synchronism with record positions are required.

Furthermore, in the case of employing a disk-like holographic recording medium and projecting laser pulses onto one point of the disk-like holographic recording medium being rotated at high speed, it is necessary to control positions irradiated with the laser pulses so as to cause the position irradiated with the laser pulses to track the rotation of the disk-like holographic recording medium and return it to the original position when the irradiation with the laser pulses is completed. Specifically, it is necessary to cause an optical pickup to track the rotation of the disk-like holographic recording medium so that the laser beam is projected onto one point on the disk-like holographic recording medium and therefore, clock signals in more accurate synchronism with record positions are required.

Moreover, in the above mentioned conventional method for removing noise, since individual optical paths for an S polarized light and a P polarized light are required for separating them, the optical system inevitably becomes large.

SUMMARY OF THE INVENTION

It is therefore an object of the present invention to provide a method for recording and reproducing holographic data and a holographic recording medium which can generate accurate clock signals and remove noise superposed on a reproduced light beam.

The above and other objects of the present invention can be accomplished by a holographic recording and reproducing method for recording holographic data in and reproducing holographic data from a holographic recording medium comprising a recording layer in which data are to be recorded as phase information of light by projecting a signal beam and a reference beam thereonto and an optical modulation pattern periodically formed in a direction of a track on a surface located on the opposite side of the recording layer as viewed in the direction of signal beam and reference beam incidence on the holographic recording medium, the holographic recording and reproducing method comprising a step of projecting a light beam for servo control onto the holographic recording medium so as to substantially focus onto the surface on which the optical modulation pattern is formed, thereby generating clock signals in synchronism with the optical modulation pattern.

According to the present invention, accurate clock signals can be generated and accurate servo control can be achieved using the thus generated clock signals.

In a preferred aspect of the present invention, the spot diameter of the light beam on the surface on which the optical modulation pattern is formed is smaller than a period of the optical modulation pattern.

According to this preferred aspect of the present invention, more accurate clock signals can be generated.

The above and other objects of the present invention can be also accomplished by a holographic recording method for recording holographic data in a holographic recording medium comprising a recording layer in which data are to be recorded as phase information of light by projecting a signal beam and a reference beam thereonto and an optical modulation pattern periodically formed in a direction of a track on a surface located on the opposite side of the recording layer as viewed in the direction of signal beam and reference beam incidence on the holographic recording medium, the holographic recording method comprising steps of sequentially recording phase information along the track and shifting a record position along the track every integer multiple of the period of the optical modulation pattern.

According to this aspect of the present invention, in the case where information is reproduced using a light beam having a relatively large spot diameter and passing through the optical modulation pattern, the influence of noise on the light beam due to the two-dimensionally superposed optical modulation pattern can be kept constant.

The above and other objects of the present invention can be also accomplished by a holographic reproducing method for recording holographic data in and reproducing holographic data from a holographic recording medium comprising a recording layer in which data are to be recorded as phase information of light by projecting a signal beam and a reference beam thereonto and an optical modulation pattern periodically formed in a direction of a track on a surface located on the opposite side of the recording layer as viewed in the direction of signal beam and reference beam incidence on the holographic recording medium, the holographic reproducing method comprising steps of projecting a reference beam onto the holographic recording medium, reproducing an image recorded in the holographic recording medium and removing noise components due to the optical modulation pattern from the thus reproduced image.

According to this aspect of the present invention, it is possible to remove noise superposed on the reproduced light beam and to improve the reliability of recorded information.

In a preferred aspect of the present invention, the noise components are removed by recording a predetermined test pattern in the holographic recording medium as the phase information, reproducing the test pattern to obtain noise information and calculating a difference between the noise information and the reproduced image.

According to this preferred aspect of the present invention, it is possible to easily obtain the noise components superposed on the reproduced image and easily remove the noise components superposed on the reproduced image.

The above and other objects of the present invention can be also accomplished by a holographic recording medium comprising a recording layer in which data are to be recorded as phase information of light by projecting a signal beam and a reference beam thereonto and an optical modulation pattern periodically formed in a direction of a track on a surface located on the opposite side of the recording layer as viewed in the direction of signal beam and reference beam incidence on the holographic recording medium.

According to this aspect of the present invention, it is possible to generate accurate clock signals and remove noise components superposed on a reproduced light beam.

In a preferred aspect of the present invention, the optical modulation pattern is constituted as a concavo-convex pattern.

According to this preferred aspect of the present invention, the optical modulation pattern can be formed so as to have a simple physical shape.

The above and other objects and features of the present invention will become apparent from the following description made with reference to the accompanying drawings.

DESCRIPTION OF THE PREFERRED EMBODIMENTS

Figure 1:
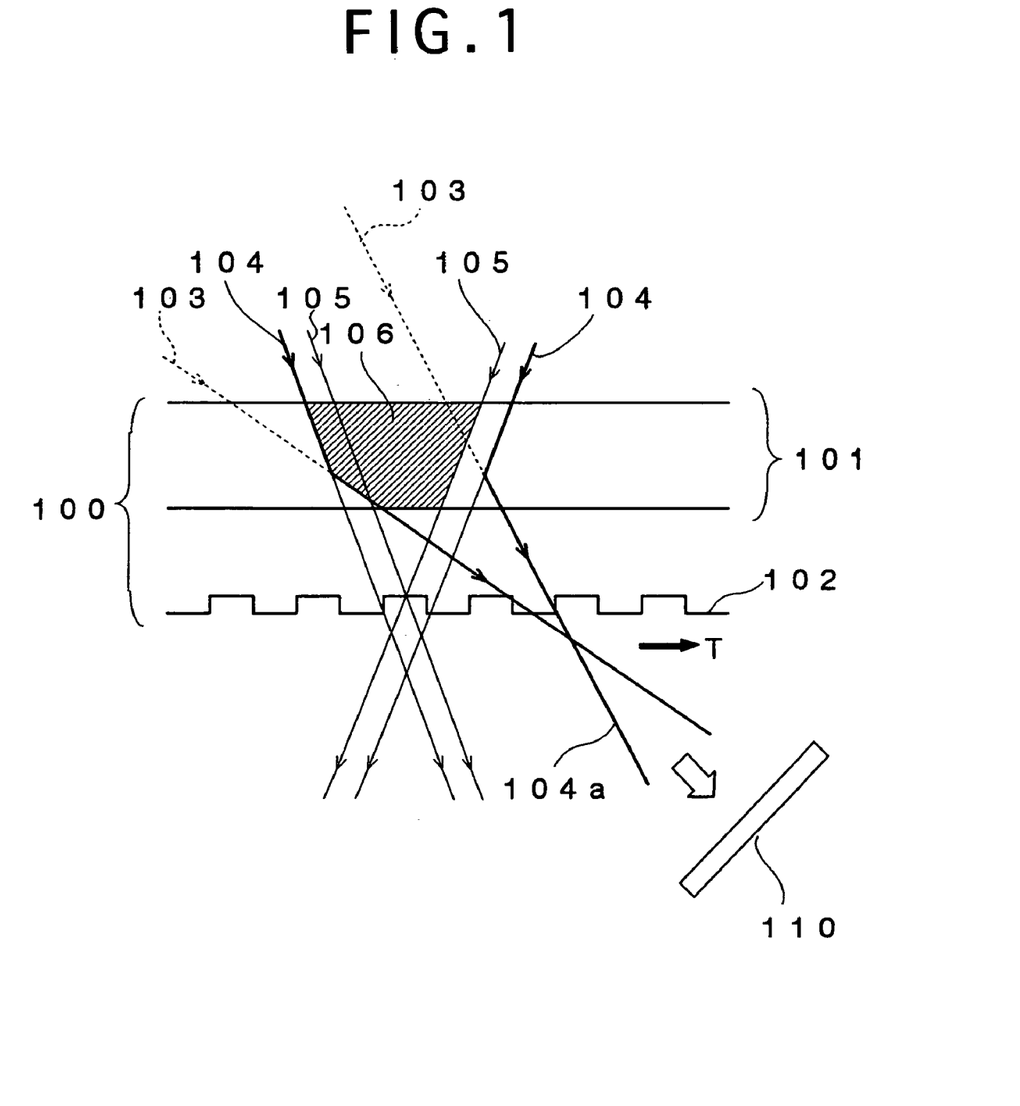
FIG. 1 is a schematic diagram showing the principle of the holographic recording and reproducing that is a preferred embodiment of the present invention.

FIG. 1 is. a schematic diagram showing the principle of the holographic recording and reproducing that is a preferred embodiment of the present invention.

As shown in FIG. 1, in the holographic recording and reproducing according to this embodiment, a holographic recording medium 100 including at least a recording layer 101 in which data are recorded as phase information of light is employed.

As shown in FIG. 1, the holographic recording medium 100 further includes a concavo-convex pattern 102 periodically formed in the direction of a track indicated by an arrow T.

In this embodiment, a signal beam 103, a reference beam 104 and a light beam 105 for servo control (hereinafter referred to as a "servo beam") enter the holographic recording medium 100 from the opposite side of the concavo-convex pattern 102 as viewed from the recording layer 101.

When servo control is effected, the servo beam 105 is projected onto the holographic recording medium 100 so as to be condensed onto the concavo-convex pattern 102.

When the servo beam 105 is continuously projected along the track, since the intensity of the servo beam 105 is modulated by the concavo-convex pattern 102, it is possible to generate clock signals based on the concavo-convex pattern 102 by detecting the servo beam 105 transmitted through the concavo-convex pattern 102. Therefore, accurate servo control can be achieved by recording a hologram in or reproducing a hologram from the holographic recording medium 100 using the thus generated clock signals.

When a hologram is to be recorded in the holographic recording medium 100, the record position is precisely ascertained using the clock signal and as shown in FIG. 1, the signal beam 103 and the reference beam 104 are overlapped in the recording layer 101. As a result, an interference fringe is generated in the recording layer 101, whereby a hologram 106 is recorded in the recording layer 101 and data are recorded as phase information of light therein.

When a hologram is to be next recorded, the record position of the hologram is shifted. The distance of the shift of the record position is determined to be equal to an integer multiple of the period of the concavo-convex pattern 102 in order to keep the influence of noise spatially superposed on a reproduced light beam when data are reproduced. For example, the distance of the shift of the record position is set so that the optical axis of the reference beam 104 is always located at the center of the convex pattern. When data are recorded by shift multiplexing, the distance of the shift of the record position can be set similarly.

Since the concavo-convex pattern 102 is formed along the track, it can be used as a tracking guide and it is therefore possible for an optical pickup to follow the track.

When a hologram is to be reproduced, the reference beam 104 is projected onto a region in the recording layer 101 where the hologram 106 is recorded and the reference beam 104 diffracted by the hologram 106 is detected by a CCD image sensor 110 as a reproduced light beam 104a. Since the reproduced light beam 104a passes through the concavo-convex pattern 102, the intensity of the reproduced light beam 104a is modulated and noise is superposed thereon. Since the reproduced light beam 104a is not always condensed onto the concavo-convex pattern 102, the spot diameter of the reproduced light beam 104a projected onto the concavo-convex pattern 102 becomes large to some extent. Therefore, noise due to the concavo-convex pattern 102 is superposed on the reproduced light beam 104a.

Figure 2:
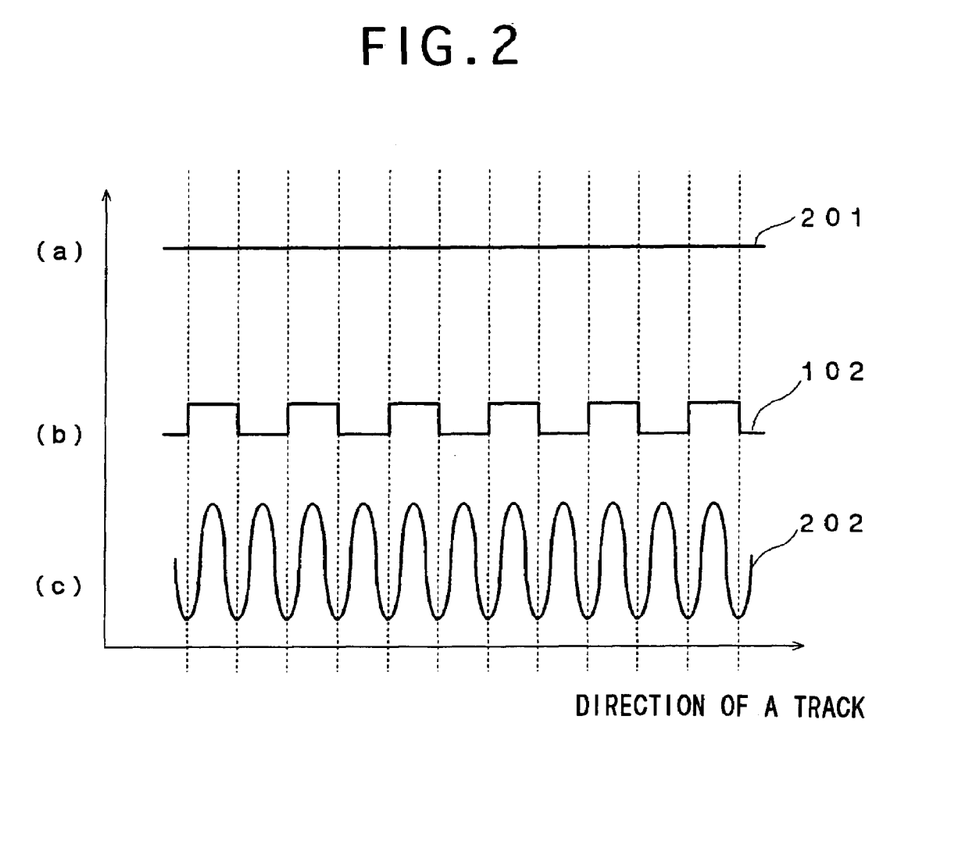
FIG. 2 is a diagram showing intensity distribution of noise components superposed on a beam transmitted through a concavo-convex pattern.

FIG. 2 is a diagram showing intensity distribution of noise components superposed on a beam transmitted through the concavo-convex pattern 102.

As shown in FIG. 2(a), it is assumed that the intensity distribution of a light beam projected onto the holographic recording medium 100 is uniform within the spot thereof and that the light beam is projected onto the holographic recording medium 100 so as to be perpendicular to the concavo-convex pattern 102. The intensity distribution of an actual light beam is Gaussian distribution and the spot of the light beam is defined as a region through which an amount of light beam equal to $1/e^2$ of the maximum intensity of the light beam passes.

When such a light beam passes through the concavo-convex pattern 102 shown in FIG. 2(b), noise is superposed on the light beam transmitted through the concavo-convex pattern 102. Since the optical path lengths of a light beam passing through a concave portion and one passing through a convex portion are different from each other, the intensity of the light beam passing through the boundary between the concave portion and the convex portion of the concavo-convex pattern 102 becomes minimum.

As a result, as shown in FIG. 2(c), noise corresponding to the period of the concavo-convex pattern 102 is spatially superposed on the light beam transmitted through the concavo-convex pattern 102.

Similarly, the reproduced light beam 104a transmitted through the concavo-convex pattern 102 includes noise due to the concavo-convex pattern 102. However, since the period of the concavo-convex pattern 102 is constant and the record positions of the holograms are constant with respect to the concavo-convex pattern 102, noise components superposed on the reproduced light beam 104a due to the concavo-convex pattern 102 are constant. Therefore, a reproduced image free of noise components can be obtained by acquiring noise components due to the concavo-convex pattern 102 in advance, detecting the reproduced light beam 104a by a CCD image sensor to generate a reproduced image containing noise components and subtracting the noise component from the reproduced image.

Figure 3:
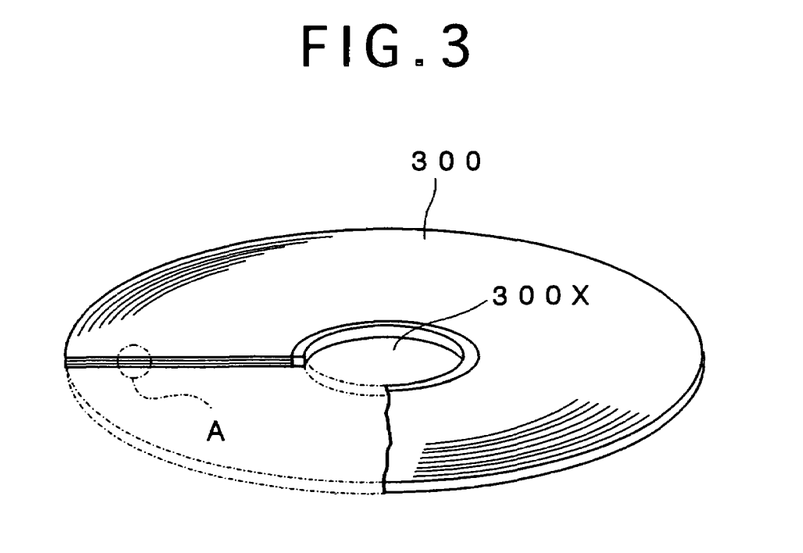
FIG. 3 is a schematic partially cutaway perspective view showing a holographic recording medium that is a preferred embodiment of the present invention.
Figure 4:
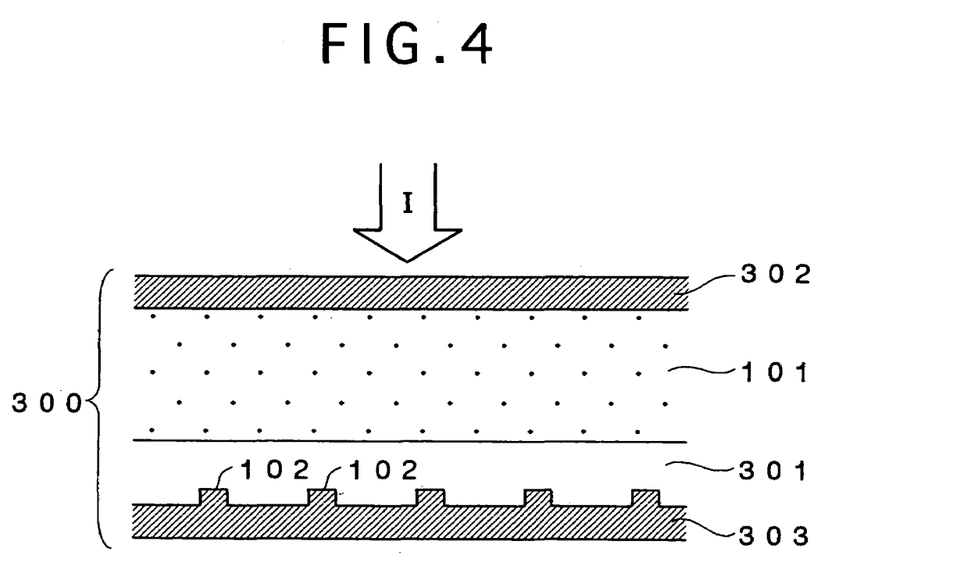
FIG. 4 is a schematic enlarged cross-sectional view showing a section indicated by the symbol A in FIG. 3.

FIG. 3 is a schematic partially cutaway perspective view showing a holographic recording medium that is a preferred embodiment of the present invention and FIG. 4 is a schematic enlarged cross-sectional view showing a section indicated by the symbol A in FIG. 3.

As shown in FIG. 3, a holographic recording medium 300 according to this embodiment has a disk-like outer shape and is formed with a hole 300x at the central portion thereof. The outer diameter and thickness of the holographic recording medium 300 is not particularly limited but, in order to enable a drive to handle the medium easily, it is preferable for the holographic recording medium 300 to have a diameter and thickness like or similar to existing optical recording media such as the CD, DVD and the like, i.e., an outer diameter of 120 mm and a thickness of 1.2 mm.

Further, as shown in FIG. 4, the holographic recording medium 300 includes a recording layer 301, an intermediate layer 301 disposed on the opposite side of the recording layer 101 as viewed in the direction of a signal beam I, a reference beam and a servo beam incident on the holographic recording medium 300, a protective layer 302 for protecting the surface of the recording layer 101 and a protective layer 303 for protecting the surface of the intermediate layer 301.

As described above, the recording layer 101 is a layer in which data are recorded as phase information of light, which is formed of a photosensitive material whose optical properties, such as refractive index, dielectric constant, reflection coefficient and the like, vary with the intensity of light projected thereonto.

The photosensitive material used for forming the recording layer 101 has high photosensitivity to the wavelengths $\lambda 0$ of the signal beam and the reference beam but low photosensitivity to the wavelength $\lambda 1$ of the servo beam. Therefore, even if the servo beam is projected onto the recording layer 101, the recording layer 101 is not exposed.

The intermediate layer 301 is a disk-like substrate formed of a material having a sufficiently high light transmittance with respect to at least light having a wavelength $\lambda 0$ and light having a wavelength $\lambda 1$, and optical paths of the signal beam, the reference beam and the servo beam are formed in the intermediate layer 301. The intermediate layer 301 serves to physically and chemically protect the recording layer 101 and as a substrate for ensuring the mechanical strength required by the holographic recording medium 300.

The material for forming the intermediate layer 301 preferably has a refractive index substantially equal to that of the recording layer 101, in order to prevent reflection at the interface between itself and the recording layer 101.

The surface of the intermediate layer 301 on the side of the protective layer 303 is formed with a periodic concavo-convex pattern 102.

The holographic recording medium 300 is formed with a spiral or concentric track and the concavo-convex pattern 102 is formed along the track.

Figure 5:
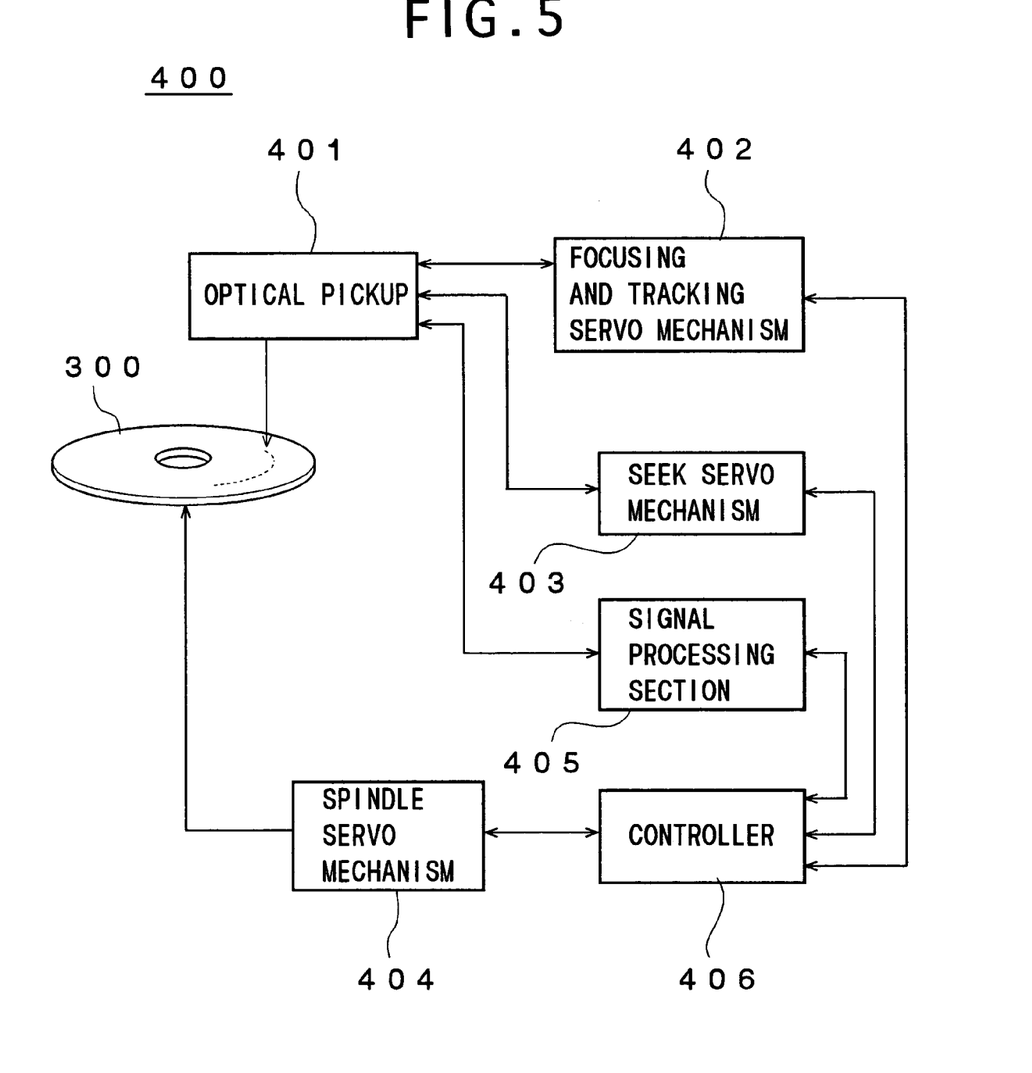
FIG. 5 is a block diagram of a holographic recording and reproducing apparatus capable of performing a holographic recording and reproducing method that is a preferred embodiment of the present invention.

FIG. 5 is a block diagram of a holographic recording and reproducing apparatus capable of performing a holographic recording and reproducing method that is a preferred embodiment of the present invention.

As shown in FIG. 5, a holographic recording and reproducing apparatus 400 includes an optical pickup 401 for generating a signal beam, a reference beam and a servo beam, a focusing and tracking servo mechanism 402 for controlling the focusing and tracking of the optical pickup 401, a seek servo mechanism 403 for controlling the position of the optical pickup 401 with respect to the holographic recording medium 300, a spindle servo mechanism 404 for controlling the rotation of the disk-like holographic recording medium 300, a signal processing section 405 for processing signals output from the optical pickup 401, and a controller 406 for controlling these means.

The signal processing section 405 is constituted so as to process a signal obtained by projecting a servo beam onto the concavo-convex pattern in the holographic recording medium 300 by the optical pickup 401 and generate clock signals. The thus generated clock signals are input to the controller 406 and used as timing clock signals. The controller 406 effects servo control in response the timing clock signals.

Specifically, the controller 406 controls the seek servo mechanism 403 based on the timing clock signals so that the seek servo mechanism 403 causes the optical pickup 401 to track the rotation of the holographic recording medium 300 when data are to be recorded in or reproduced from the holographic recording medium 300 and that otherwise, the seek servo mechanism 403 sets the optical pickup 401 at a next record or reproduction position.

The tracking operation of the seek servo mechanism 403 is in synchronism with the period of clock signals or an integer multiple thereof.

Address information used for identifying the record or reproduction position of a hologram may be read from address pits separately formed along the track or may be retained on the track by wobbly modulating the track itself, namely, the concavo-convex pattern. Further, address information may be retained in the holographic recording medium 300 by modulating the concavo-convex pattern in the depth direction thereof.

The controller 406 controls the focusing and tracking servo mechanism 402 based on the timing clock signals so as to effect focus adjustment and tracking control with respect to the concavo-convex pattern. Further, the controller 406 controls the spindle servo mechanism 404 so that the period of the timing clock signals become a predetermined one, thereby adjusting the rotation speed of the holographic recording medium 300.

Accordingly, it is possible to record a hologram at a predetermined position of the concavo-convex pattern of the holographic recording medium 300 and reproduce a hologram recorded at a predetermined position of the concavo-convex pattern of the holographic recording medium 300.

Further, in the case of shift multiplexing, it is possible to set the shift distance between neighboring holograms based on the timing clock signals so as to be equal to an integer multiple of the period of the concavo-convex pattern and keep the influence of noise spatially superposed owing to the concavo-convex pattern constant.

Figure 6:
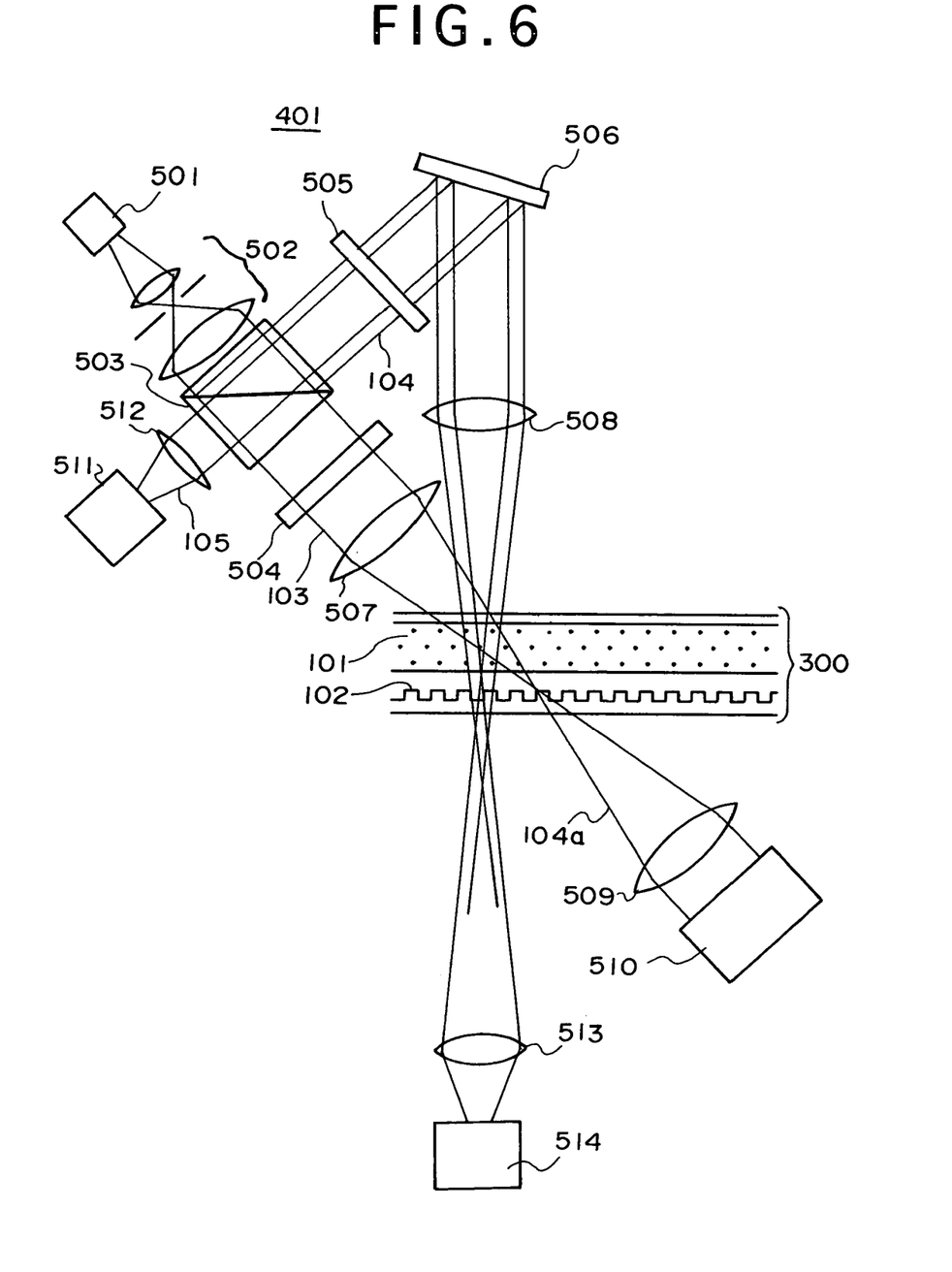
FIG. 6 is a block diagram showing the configuration of the optical pickup.

FIG. 6 is a block diagram showing the configuration of the optical pickup 401.

As shown in FIG. 6, the optical pickup 401 is constituted as a transmission type optical pickup and includes as an optical system for recording and reproducing data, a laser beam source 501 for generating a laser beam having a wavelength $\lambda 0$ and containing an S polarization component and a P polarization component, a beam expander 502, a polarizing beam splitter 503, a spatial light modulator (SLM) 504, a halfwave plate 505, a total reflective mirror 506, a Fourier transform lens 507, a Fourier transform lens 508, a collimator lens 509 and a CCD image sensor 510.

Further, the optical pickup 401 includes as an optical system for servo control a laser beam source 511 for generating a laser beam having a wavelength $\lambda 1$, a collimator lens 512, a condenser lens 513 and a photo-detector (PD) 514.

The laser beam source 501 for recording and reproducing data generates laser pulses in synchronism with the clock signals or the integer multiple thereof. A light beam generated by the laser beam source 501 for recording and reproducing data passes through the beam expander 502, whereby the beam diameter thereof is expanded and is made a parallel beam and enters the polarizing beam splitter 503. The polarizing beam splitter 503 causes an S polarization component of the incident light beam to pass therethrough and reflects a P polarization component, thereby splitting the light beam into two light beams. The one of the thus split light beams consisting of the S polarization component then enters the spatial light modulator (SLM) 504.

The spatial light modulator 504 has a large number of pixels arranged in a matrix and spatially modulates the intensity of the light beam by selectively passing or blocking the light beam at each pixel, thereby generating a signal beam carrying information. A liquid crystal device or a DMD (digital micro-mirror device), for example, can be employed as the spatial light modulator 504.

When data are to be recorded in the holographic recording medium 300, a signal beam 103 having a predetermined pattern is generated by selectively turning on or off the pixels of the spatial light modulator 504 in accordance with data to be recorded. The signal beam 100 emitted from the spatial light modulator 504 is condensed by the Fourier transform lens 507 onto the holographic recording medium 300.

On the other hand, the other of the split light beams consisting of the P polarization component is transformed by the halfwave plate 505 into a light beam consisting of an S polarization component, like the first-mentioned light beam. Then, this second light beam is reflected by the total reflective mirror 506 and passes through the Fourier transform lens 508 to be projected onto the holographic recording medium 300 as a reference beam 104.

The signal beam 103 and the reference beam 104 are overlapped in the recording layer 101 of the holographic recording medium 300 to form an interference pattern, thereby recording a hologram 106 in the recording layer 101 of the holographic recording medium 300.

When data are to be reproduced, all of the pixels of the spatial light modulator 504 are turned off, thereby blocking the signal beam.

Therefore, the light beam generated by the laser beam source 501 for recording and reproducing data, passing through the beam expander 502, the polarizing beam splitter 503, the spatial light modulator 504 and the halfwave plate 505, reflected by the total reflective mirror 506 and passing through the Fourier transform lens 508 is projected on the holographic recording medium 300 as a reference beam 104.

The reference beam 104 is diffracted by the interference pattern formed in the recording layer 101 in the direction of the optical axis of the signal beam 103 to be transmitted through the holographic recording medium 300 and the intensity of the reference beam 104 is modulated by the interference pattern to generate a reproduced light beam 104a carrying information. The reproduced light beam 104a passes through the collimator lens 509 and is projected onto the CCD image sensor 510.

The CCD image sensor 510 is constituted so that the shutter thereof is opened and closed in response to the emitting of the light beam from the laser beam source 501 for recording and reproducing data. Therefore, the timing of the CCD image sensor 510 imaging is also in synchronism with the period of the clock signals or the integer multiple thereof.

Since the reference beam 104 has a relatively large spot diameter when it passes through the concavo-convex pattern 102 in the holographic recording medium 300, a predetermined noise component is spatially superposed on a reproduced light beam 104a due to the concavo-convex pattern 102. Since the noise component can be acquired in advance, noise can be removed by subtracting in advance the noise component from a reproduced image detected by the CCD image sensor 510. As described above, the noise processing is effected by the signal processing section 405 and the controller 406.

The noise component can be acquired in advance in the following manner.

A predetermined test pattern image is first recorded in the holographic recording medium 300 as phase information.

Then, the test pattern image is reproduced and the thus reproduced test pattern image is compared with the recorded test pattern image, whereby difference therebetween is calculated to be stored in a memory. The thus stored difference is used as noise information.

When servo control is effected, all of the pixels of the spatial light modulator 504 are turned off, thereby blocking the signal beam.

Therefore, the servo beam 105 generated by the laser beam source 511 passes through the collimator lens 512, whereby it is made parallel and passes through the polarizing beam splitter 503 and the halfwave plate 505. The servo beam 105 is further reflected by the total reflective mirror 506, passes through the Fourier transform lens 508 and is projected onto the holographic recording medium 300.

The servo beam 105 transmits through the holographic recording medium 300 and is condensed by the condenser lens 513 onto the photo-detector 514. The photo-detector 514 generates servo signals modulated in accordance with the intensity of the servo beam 105.

The servo beam 105 is substantially focused onto the concavo-convex pattern 102 in the holographic recording medium 300 and the intensity thereof is modulated by the concavo-convex pattern 102. The optical path lengths of a light beam passing through a concave portion and one passing through a convex portion are different from each other, so that when the servo beam 105 passes through the concavo-convex pattern 102 with one half portion thereof passing through the concave portion and the other half portion thereof passing through the convex portion, the intensity of the servo beam becomes minimum. Therefore, a servo signal whose intensity is modulated in accordance with the period of the concavo-convex pattern 102 can be obtained from the photo-detector 514, thereby reproducing the clock signals.

Figure 7:
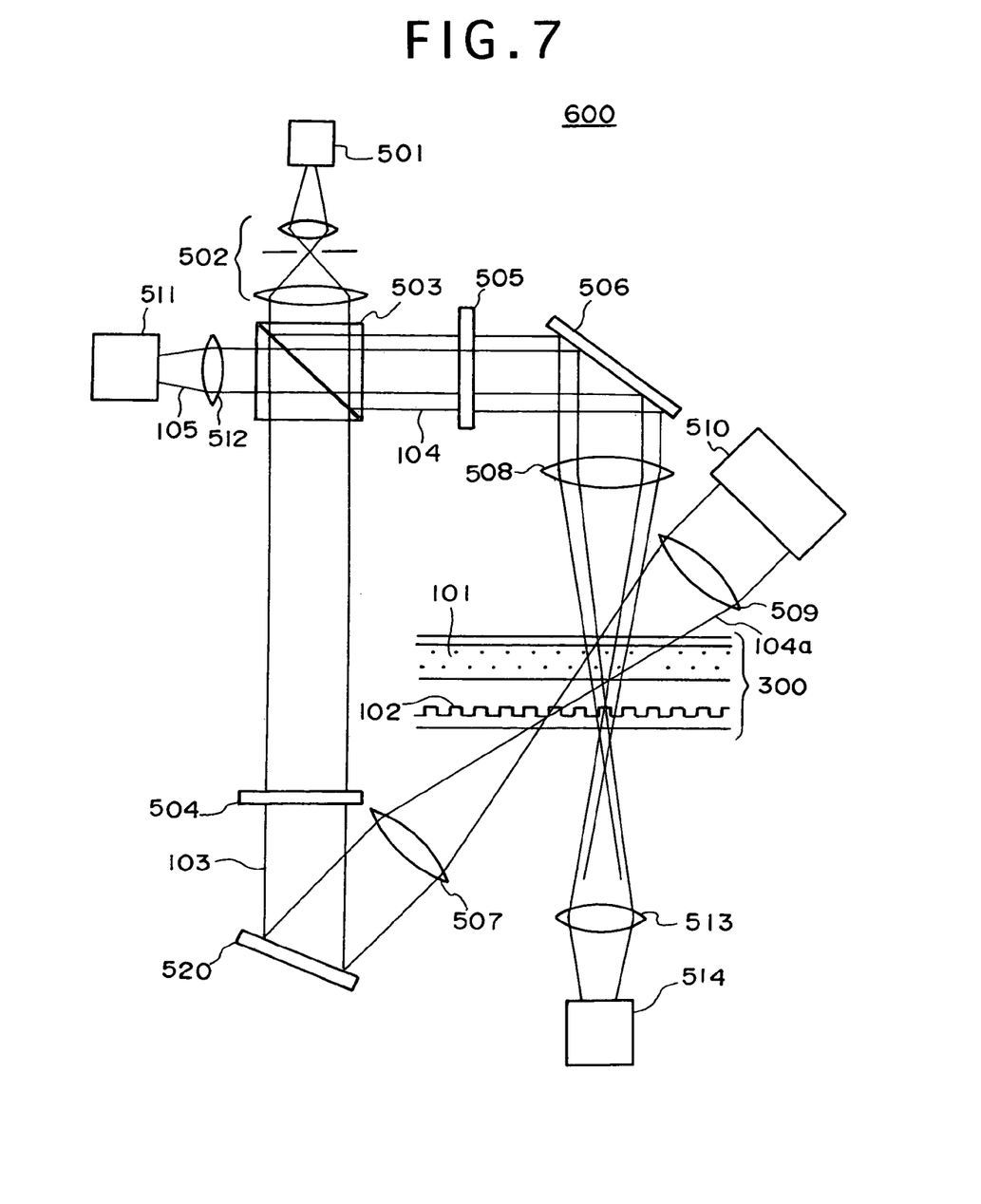
FIG. 7 is a block diagram showing a configuration of another example of an optical pickup.

FIG. 7 is a block diagram showing a configuration of another example of an optical pickup.

An optical pickup 600 shown in FIG. 7 is constituted as a reflection type and includes an optical system for recording and reproducing data and an optical system for servo control similar to those of the optical pickup 401 shown in FIG. 6 but is different therefrom in that a signal beam 103 is projected on a holographic recording medium 300 from the opposite direction to that in which a reference beam 104 enters, namely, from the reverse side of the holographic recording medium 300.

As shown in FIG. 7, a light beam generated by the laser beam source 501 for recording and reproducing data passes through the beam expander 502, whereby the spot diameter thereof is expanded and is made a parallel beam and enters the polarizing beam splitter 503. The polarizing beam splitter 503 causes an S polarization component of the incident light beam to pass therethrough and reflects a P polarization component, thereby splitting the light beam into two light beams. One of the thus split light beams of the S polarization component then enters the spatial light modulator (SLM) 504.

When data are to be recorded in the holographic recording medium 300, a signal beam 103 having a predetermined pattern is generated by selectively turning on or off the pixels of the spatial light modulator 504 in accordance with data to be recorded. The signal beam 100 emitted from the spatial light modulator 504 is reflected by a total reflective lens 520, whereby the direction thereof is changed and is condensed by the Fourier transform lens 507 onto the holographic recording medium 300.

On the other hand, the other of the split light beams consisting of the P polarization component is transformed by the halfwave plate 505 into a light beam consisting of an S polarization component, like the first-mentioned light beam. Then, this second light beam is reflected by the total reflective mirror 506 and passes through the Fourier transform lens 508 to be projected onto the holographic recording medium 300 as a reference beam 104.

The signal beam 103 and the reference beam 104 overlap in the recording layer 101 of the holographic recording medium 300 to form an interference pattern, thereby recording a hologram 106 in the recording layer 101 of the holographic recording medium 300.

Since the signal beam 103 has a relatively large spot diameter when it passes through the concavo-convex pattern 102 in the holographic recording medium 300, a predetermined noise component is spatially superposed on the signal beam 104 due to the concavo-convex pattern 102. Therefore, the interference pattern generated by the signal beam 103 and the reference beam 104 also contains a noise component.

When data are to be reproduced, all of the pixels of the spatial light modulator 504 are turned off, thereby blocking the signal beam.

The light beam generated by the laser beam source 501 for recording and reproducing data therefore passes through the beam expander 502, the polarizing beam splitter 503, the spatial light modulator 504 and the halfwave plate 505, is reflected by the total reflective mirror 506 and passes through the Fourier transform lens 508 to be projected on the holographic recording medium 300 as a reference beam 104.

The reference beam 104 is diffracted by the interference pattern formed in the recording layer 101 in the direction of the optical axis of the signal beam 103 to be reflected by the holographic recording medium 300 and the intensity of the reference beam 104 is modulated by the interference pattern to generate a reproduced light beam 104a carrying information. A noise component is superposed on the reproduced light beam 104a. The reproduced light beam 104a passes through the collimator lens 509 and is projected onto the CCD image sensor 510.

Since the noise component superposed on the reproduced light beam 104a can be acquired in advance, noise can be removed by subtracting in advance the noise component from the reproduced image detected by the CCD image sensor 510. The noise processing is effected by the signal processing section 405 and the controller 406.

When servo control is effected, all of the pixels of the spatial light modulator 504 are turned off, thereby blocking the signal beam.

Therefore, the servo beam 105 generated by the laser beam source 511 passes through the collimator lens 512, whereby it is made parallel, and passes through the polarizing beam splitter 503 and the halfwave plate 505. The servo beam 105 is further reflected by the total reflective mirror 506, passes through the Fourier transform lens 508 and is projected onto the holographic recording medium 300. The servo beam 105 transmits through the holographic recording medium 300 and is condensed by the condenser lens 513 onto the photo-detector 514. The photo-detector 514 generates servo signals modulated in accordance with the intensity of the servo beam 105.

The servo beam 105 is substantially focused onto the concavo-convex pattern 102 in the holographic recording medium 300 and the intensity thereof is modulated by the concavo-convex pattern 102. Therefore, a servo signal whose intensity is modulated in accordance with the period of the concavo-convex pattern 102 can be obtained from the photo-detector 514, thereby reproducing the clock signals.

The present invention has thus been shown and described with reference to specific embodiments. However, it should be noted that the present invention is in no way limited to the details of the described arrangements but changes and modifications may be made without departing from the scope of the appended claims.

For example, the above embodiments were explained with respect to disk-like holographic recording media. However, the holographic recording medium is not particularly limited and any of various types of holographic recording media such as card-like, block-like, stick-like or the like can be selected.

Further, the above embodiments were explained with respect to rotating disk-like holographic recording media. However, it is not absolutely necessary for a disk-like holographic recording medium to rotate and the holographic recording medium may be kept stationary. For example, it is possible to apply the present invention to a configuration wherein a card-like holographic recording medium is fixed upon insertion into a card slot and only the optical pickup is moved.

Furthermore, in the above described embodiments, the concavo-convex pattern is formed along a track in the holographic recording medium. However, it is not absolutely necessary to form the concavo-convex pattern along a track in the holographic recording medium and, instead of the concavo-convex pattern, it is possible to form the holographic recording medium with a pattern whose refractive index, light absorbance or reflectivity varies.

Moreover, in the above described embodiments, the concavo-convex pattern is formed in the holographic recording medium so that both the light beam having a wavelength $\lambda 0$ and the light beam having a wavelength $\lambda 1$ can transmit therethrough. However, it is not absolutely necessary for the concavo-convex pattern to be formed in the holographic recording medium so that both the light beam having a wavelength $\lambda 0$ and the light beam having a wavelength $\lambda 1$ can transmit therethrough and if an optical system for servo control is disposed on the side of a servo beam, the concavo-convex pattern can be formed so that only a light beam having a wavelength $\lambda 0$ passes therethrough and a light beam having a wavelength $\lambda 1$ is reflected thereby.

According to the present invention, it is possible to provide a method for recording and reproducing holographic data and a holographic recording medium which can generate accurate clock signals and remove noise superposed on a reproduced light beam.

The invention claimed is:

1. A holographic recording and reproducing method for recording holographic data in and reproducing holographic data from a holographic recording medium comprising a recording layer in which data are to be recorded as phase information of light by projecting a signal beam and a reference beam emitted from a first light source and having a wavelength $\lambda 0$ thereonto and an optical modulation pattern periodically formed in a direction of a track on a surface located on an opposite side of the recording layer as viewed in a direction of signal beam and reference beam incidence on the holographic recording medium, the holographic recording and reproducing method comprising projecting a light beam for servo control emitted from a second light source and having a wavelength $\lambda 1$ onto the holographic recording medium so as to substantially focus onto the surface on which the optical modulation pattern is formed, thereby generating clock signals in synchronism with the optical modulation pattern, wherein during recording, the signal beam is projected along a first optical path and the reference beam and the light beam for servo control are projected along a second optical path different than the first optical path.

2. A holographic recording and reproducing method in accordance with claim 1, wherein a spot diameter of the light beam on the surface on which the optical modulation pattern is formed is smaller than a period of the optical modulation pattern.

3. A holographic recording method for recording holographic data in a holographic recording medium comprising a recording layer in which data are to be recorded as phase information of light by projecting a signal beam and a reference beam emitted from a first light source and having a wavelength $\lambda 0$ thereonto and an optical modulation pattern periodically formed in a direction of a track on a surface located on an opposite side of the recording layer as viewed in a direction of signal beam and reference beam incidence on the holographic recording medium, the holographic recording method comprising projecting a light beam for servo control emitted from a second light source and having a wavelength $\lambda 1$ onto the holographic recording medium so as to substantially focus onto the surface on which the optical modulation pattern is formed, thereby generating clock signals in synchronism with the optical modulation pattern, sequentially recording phase information along the track, and shifting a record position along the track every integer multiple of a period of the optical modulation pattern, wherein during recording, the signal beam is projected along a first optical path and the reference beam and the light beam for servo control are projected along a second optical path different than the first optical path.

4. A holographic reproducing method for reproducing holographic data from a holographic recording medium comprising a recording layer in which data and a test pattern for obtaining noise information are to be recorded as phase information of light by projecting a signal beam and a reference beam emitted from a first light source and having a wavelength $\lambda 0$ thereonto and an optical modulation pattern periodically formed in a direction of a track on a surface located on an opposite side of the recording layer as viewed in a direction of signal beam and reference beam incidence on the holographic recording medium, the holographic reproducing method comprising projecting a light beam for servo control emitted from a second light source and having a wavelength $\lambda 1$ onto the holographic recording medium so as to substantially focus onto the surface on which the optical modulation pattern is formed, thereby generating clock signals in synchronism with the optical modulation pattern, projecting a reference beam onto the holographic recording medium, reproducing an image recorded in the holographic recording medium, and removing noise components due to the optical modulation pattern from the thus reproduced image.

5. A holographic reproducing method for reproducing holographic data from a holographic recording medium in accordance with claim 4, wherein the noise components are removed by recording a test pattern in the holographic recording medium as the phase information, reproducing the test pattern to obtain noise information and calculating a difference between the noise information and the reproduced image.

6. A holographic recording and reproducing method in accordance with claim 1, wherein said light beam for servo control is projected during the holographic recording and reproducing process.

7. A holographic reproducing method for reproducing holographic data from a holographic recording medium comprising a recording layer in which a test pattern for obtaining noise information is recorded as phase information of light, the holographic reproducing method comprising:
  reproducing the test pattern to obtain noise information due to an optical modulation pattern;
  reproducing an image recorded in the holographic recording medium;
  calculating a difference between the noise information and the reproduced image; and
  removing noise components from the thus reproduced image.

* * * * *